US008145744B2

(12) United States Patent
Gielis

(10) Patent No.: US 8,145,744 B2
(45) Date of Patent: Mar. 27, 2012

(54) STATE REMOTE READING DEVICE, AND USES THEREOF

(75) Inventor: Michel Gielis, Muralto (CH)

(73) Assignee: Inventio AG, Hergiswil (CH)

( * ) Notice: Subject to any disclaimer, the term of this patent is extended or adjusted under 35 U.S.C. 154(b) by 572 days.

(21) Appl. No.: 10/517,797

(22) PCT Filed: Jun. 12, 2003

(86) PCT No.: PCT/EP03/07129

§ 371 (c)(1),
(2), (4) Date: Dec. 13, 2004

(87) PCT Pub. No.: WO03/107295

PCT Pub. Date: Dec. 24, 2003

(65) Prior Publication Data

US 2006/0077033 A1 Apr. 13, 2006

(30) Foreign Application Priority Data

Jun. 13, 2002 (FR) ..................................... 02 07295

(51) Int. Cl.
*G06F 15/173* (2006.01)
*B66B 9/00* (2006.01)
*H04B 1/38* (2006.01)

(52) U.S. Cl. ......................... 709/224; 187/247; 455/571

(58) Field of Classification Search ........................ None
See application file for complete search history.

(56) References Cited

U.S. PATENT DOCUMENTS 1,526,306 A * 2/1925 Sprenger ........................ 188/307
1,715,701 A * 6/1929 Fortescue ....................... 370/278
4,193,478 A 3/1980 Keller et al.
4,252,217 A * 2/1981 Benjamin ...................... 414/592
4,298,100 A 11/1981 Suss et al.
4,821,291 A 4/1989 Stevens et al. .................. 375/37
4,872,532 A 10/1989 Tobita et al.
4,879,756 A 11/1989 Stevens et al. .................. 455/39
4,937,586 A 6/1990 Stevens et al. ................ 343/702
4,979,593 A * 12/1990 Watanabe et al. ............. 187/245
5,028,918 A 7/1991 Giles et al. ............... 340/825.54
5,202,540 A * 4/1993 Auer et al. ..................... 187/247
5,260,701 A 11/1993 Guern et al.
5,274,203 A * 12/1993 Skalski et al. ................ 187/393
5,532,465 A * 7/1996 Waterhouse et al. ......... 235/383
5,535,212 A * 7/1996 Koopman et al. ............. 370/455
5,732,795 A * 3/1998 McCarthy et al. ............ 187/250
5,793,360 A 8/1998 Fleck et al.
5,850,416 A * 12/1998 Myer ............................ 375/221

(Continued)

FOREIGN PATENT DOCUMENTS

NZ 501864 8/2002

(Continued)

*Primary Examiner* — Karen Tang

(74) *Attorney, Agent, or Firm* — Wolff & Samson, PC

(57) ABSTRACT

The invention concerns a device for remote reading of states, comprising a communication network (1), a plurality of peripherals (31 to 33) each of which adopts an instantaneous state (STAT_1 to STAT_3), and a controller (2) periodically scanning said peripherals (31 to 33) to read therefrom the instantaneous state (STAT_1 to STAT_3). The invention is characterized in that the communication network (1) electromagnetically connects the peripherals (31 to 33) to the controller (2), and said peripherals (31 to 33) are supplied with electrical energy via said communication network (1). The invention is useful for managing calls in lifts by means of peripherals not provided with any galvanic connection and with any individual power source.

22 Claims, 3 Drawing Sheets

U.S. PATENT DOCUMENTS

| | | | | | |
|---|---|---|---|---|---|
| 5,854,454 | A | * | 12/1998 | Upender et al. | 187/247 |
| 5,975,248 | A | | 11/1999 | Lewis | |
| 5,984,051 | A | * | 11/1999 | Morgan et al. | 414/183 |
| 6,003,637 | A | | 12/1999 | Kim et al. | |
| 6,084,513 | A | * | 7/2000 | Stoffer | 340/572.2 |
| 6,163,270 | A | * | 12/2000 | Silverman | 340/3.3 |
| 6,209,480 | B1 | * | 4/2001 | Moslehi | 118/723 I |
| 6,269,911 | B1 | * | 8/2001 | Richter | 187/289 |
| 6,341,668 | B1 | * | 1/2002 | Fayette et al. | 187/391 |
| 6,446,761 | B1 | * | 9/2002 | Motoyama et al. | 187/391 |
| 6,601,679 | B2 | * | 8/2003 | Crenella et al. | 187/395 |
| 6,732,839 | B2 | * | 5/2004 | Schuster | 187/391 |
| 2002/0024460 | A1 | * | 2/2002 | Ghosh et al. | 342/43 |
| 2002/0167393 | A1 | * | 11/2002 | Mabuchi et al. | 340/5.3 |
| 2003/0057030 | A1 | * | 3/2003 | Yumura et al. | 187/394 |
| 2003/0191730 | A1 | * | 10/2003 | Adkins et al. | 706/47 |
| 2004/0174073 | A9 | * | 9/2004 | Face et al. | 307/116 |

FOREIGN PATENT DOCUMENTS

| | | |
|---|---|---|
| WO | WO 01/02211 | 1/2001 |

* cited by examiner

STATE REMOTE READING DEVICE, AND USES THEREOF

PRIORITY CLAIM

This is a U.S. national stage of International Application No. PCT/EP2003/07129, filed on Jun. 12, 2003. Priority is claimed on that application and on the following application: Country: France, Application No. 02/07295, Filed: Jun. 13, 2002.

BACKGROUND OF THE INVENTION

The present invention relates, generally speaking, to the field of information technologies.

More precisely, according to one of its first aspects, the invention relates to a device for remote status readings, comprising a communication network, a central controller linked to the communication network, and a plurality of peripheral devices linked to the controller through the intermediary of the network, each peripheral device adopting, at each instant, an instantaneous status belonging to a plurality of possible statuses, and the controller periodically scanning the peripheral devices to read their instantaneous status.

Even though many known devices fulfil this definition, these devices usually involve using sophisticated means, leading to a relatively high structural complexity.

SUMMARY OF THE INVENTION

Within this context, the device according to the invention has the aim of proposing a technique making it possible to offer the same functions as these known devices, but by implementing simple means that are widespread these days.

In order to do this, the device according to the invention, moreover complying with the generic definition given in the above preamble, is essentially characterized in that the communication network links the peripheral devices to the controller by electromagnetic means. The peripheral devices are supplied with electrical energy through the intermediary of the communication network.

As a result of this layout, all the connector technology problems are significantly reduced.

For example, the communication network can simply comprise a series circuit supplied by the controller and including a plurality of electromagnetic induction loops.

The device according to the invention can be adapted to localized remote status readings by ensuring that each peripheral device has an identification code of its own, that the controller has a configuration memory in which, for each peripheral device, the identification code of this peripheral device and a localization parameter are stored correlatively, identifying the location of this peripheral device in the network, and that, for each peripheral device, the controller reads the instantaneous status of this peripheral device and its identification code, as a result of which each instantaneous status reading is correlated by the controller with a location on the network.

Whatsoever the intended application, each peripheral device can include, apart from a transmitter-receiver circuit, at least one status encoder adopting an instantaneous status constituting or participating in building up the instantaneous status of this peripheral device. The status encoder is linked to the transmitter-receiver circuit to enable the peripheral device to transmit the instantaneous status of the encoder to the controller.

In a possible embodiment of the invention, each peripheral device comprises an electronic tag provided with a memory containing the identification code attributed to this peripheral device, a local antenna coupled to an induction loop of the communication network to receive the electrical energy transmitted by this induction loop, and from the transmitter-receiver circuit. The transmitter-receiver circuit is linked to the local antenna at least to receive a transmission order from the controller and for transmitting to the controller, apart from the instantaneous status of the encoder, the identification code of this tag.

The electronic tags, still called "radio tags", "clever tags" or "smart cards", are widely used these days in many applications for automatic identification, and particularly in anti-theft systems, protection against counterfeiting, the management of handling supports, control of dispatching or reception, etc.

By proposing the use of such tags to obtain remote status readings spread over different locations, the invention thus proposes extending the widespread and proven technique of identification by radio-frequency, or RFTD (Radio Frequency Identification) to localization in space, thus avoiding the inherent complexities of addressing techniques.

For example, each peripheral device includes, as status encoder, at least one appropriate element such as an electrical contact.

However, each peripheral device can also include, as status encoder, at least one sensor sensitive to the influence of a physical parameter to which this peripheral device is subject.

The utility of the device according to the invention can further be increased by providing each peripheral device with a tagging element.

This device is applicable, in general, to remote control management, each peripheral device forming a command terminal able to transmit a determined order to the controller, coded by the instantaneous status adopted by this peripheral device.

When it is adapted to localized remote status readings, this device is applicable to management of remote calls, each peripheral device forming a calling terminal.

In particular, each peripheral device can be installed at a specific location, such as a floor of a building, and form a calling terminal for a means of transport, such as an elevator.

Finally, in the case where the status encoder for each peripheral device comprises a plurality of appropriate elements, such as electrical contacts, each of these elements can identify a destination assigned to the means of transport from a departure position represented by the specific location.

For example, a user of an elevator can not only call the elevator to the floor where the user is situated but can, besides this, indicate which floor he wishes to go to.

BRIEF DESCRIPTION OF THE DRAWINGS

Other characteristics and advantages of the invention will become clear from the description given below, as an indicative and in no way limiting example, with reference to the attached drawings, in which.

DETAILED DESCRIPTION OF THE INVENTION

As mentioned above, the invention relates to a device (FIG. 3) for remote status readings of the type comprising a communication network 1, a central controller 2 linked to the communication network 1, and a plurality of peripheral devices, such as 31 to 33, linked to the controller 2 through the intermediary of the network 1.

At any instant, each of the peripheral devices 31 to 33 takes, from amongst a group of a priori possible statuses, an instantaneous status respectively named STAT_1, STAT_2 and STAT_3 for the different peripheral devices 31 to 33, the controller 2 periodically scanning these peripheral devices 31 to 33 to read the respective instantaneous statuses.

The device according to the invention is distinctive from known devices of this type first of all through the fact that the communication network 1 links the peripheral devices, such as 31 to 33, to the controller 2 by electromagnetic means, and that the peripheral devices are supplied with electrical energy through the intermediary of this communication network 1.

As a result of this layout, the very presence of the communication network makes it possible to eliminate both the need for providing a separate electrical supply network, and the need for ensuring point to point electrical connection for each of the peripheral devices.

Figure 2:
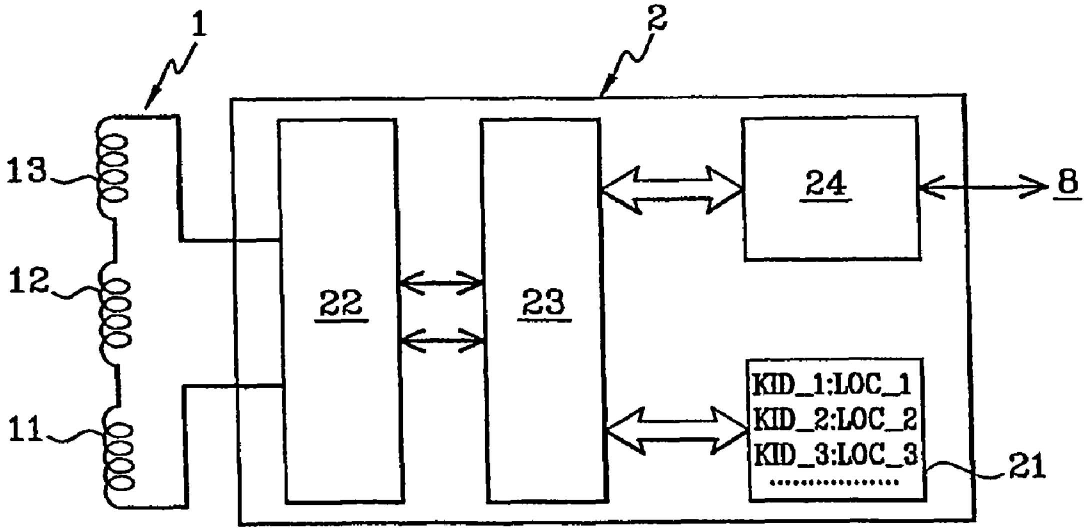
FIG. 2 is a diagrammatic view of a central controller able to co-operate with the peripheral device of FIG. 1 in a device according to the invention.

For example, the communication network 1 includes a series circuit that itself is supplied by the controller 2 and which includes a plurality of electromagnetic induction loops such as 11, 12 and 13 (FIGS. 2 and 3), the electric power signal circulating in this, series circuit having a frequency typically lower than 500 kHz, and being modulated, for example, at 125 kHz.

Moreover, each peripheral device 31, 32 or 33 is provided with a status encoder 61, 62 or 63, and a transmitter-receiver circuit 421, 422 or 423. The status encoder 61, 62 or 63 is able to produce the instantaneous status STAT_1, STAT_2 or STAT_3 of the associated peripheral device, and is linked to the transmitter-receiver circuit 421, 422 or 423 of the associated peripheral device to allow it to transmit the instantaneous status STAT_1, STAT_2 or STAT_3 to the controller 2.

In these conditions, each of the peripheral devices 31 to 33 can form a command terminal in the network 1, able to transmit an order to the controller 2 coded by the instantaneous status adopted by this peripheral device.

In an advanced embodiment of the device according to the invention, allowing localized remote reading of statuses, each of the peripheral devices such as 31 to 33 furthermore possesses its own identification code, called KID_1, KID_2 or KID_3 respectively, for the different peripheral devices 31 to 33.

Figure 1:
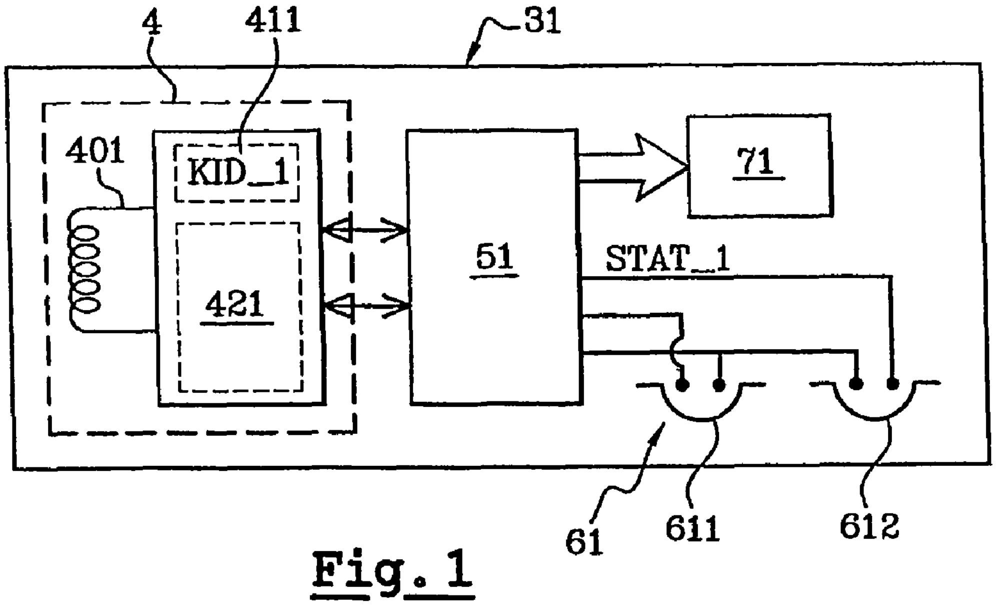
FIG. 1 is a diagrammatic view of a peripheral device applied in a device according to the invention, and using an electronic tag as principal component.

In order to do this, each peripheral device 31 to 33 preferably includes an electronic tag such as reference 4 (FIG. 1).

An electronic tag is typically provided with a memory such as 411, a local antenna such as 401, and a transmitter-receiver circuit such as 421. The circuit 421 in this case is capable of constituting the transmitter-receiver circuit mentioned above of the peripheral device equipped with this tag.

The tags of the different peripheral devices 31, 32 and 33 thus comprise, respectively, (FIG. 3), memories 411, 412 and 413, local antennae 401, 402 and 403, and transmitter-receiver circuits 421, 422 and 423.

Each memory 411, 412 or 413 contains the identification code KID_1, KID_2 or KID_3 attributed to the corresponding peripheral device 31, 32 or 33.

Each local antenna 401, 402 or 403 is coupled to one of the induction loops 11, 12 or 13 of the communication network 1 to receive the electrical energy transmitted by the induction loop.

Furthermore, each transmitter-receiver circuit 421, 422 or 423 is linked to the corresponding local antenna 401, 402 or 403 to be able to receive, from the corresponding induction loop, the electrical energy needed to supply the peripheral device concerned, to receive a transmission command from the controller 2, and to transmit to this controller 2 the instantaneous status STAT_1, STAT_2 or STAT_3 of the corresponding peripheral device 31, 32 or 33, together with the identification code KID_1, KID_2 or KID_3 of the tag concerned, in the advanced embodiment of the invention.

Figure 3:
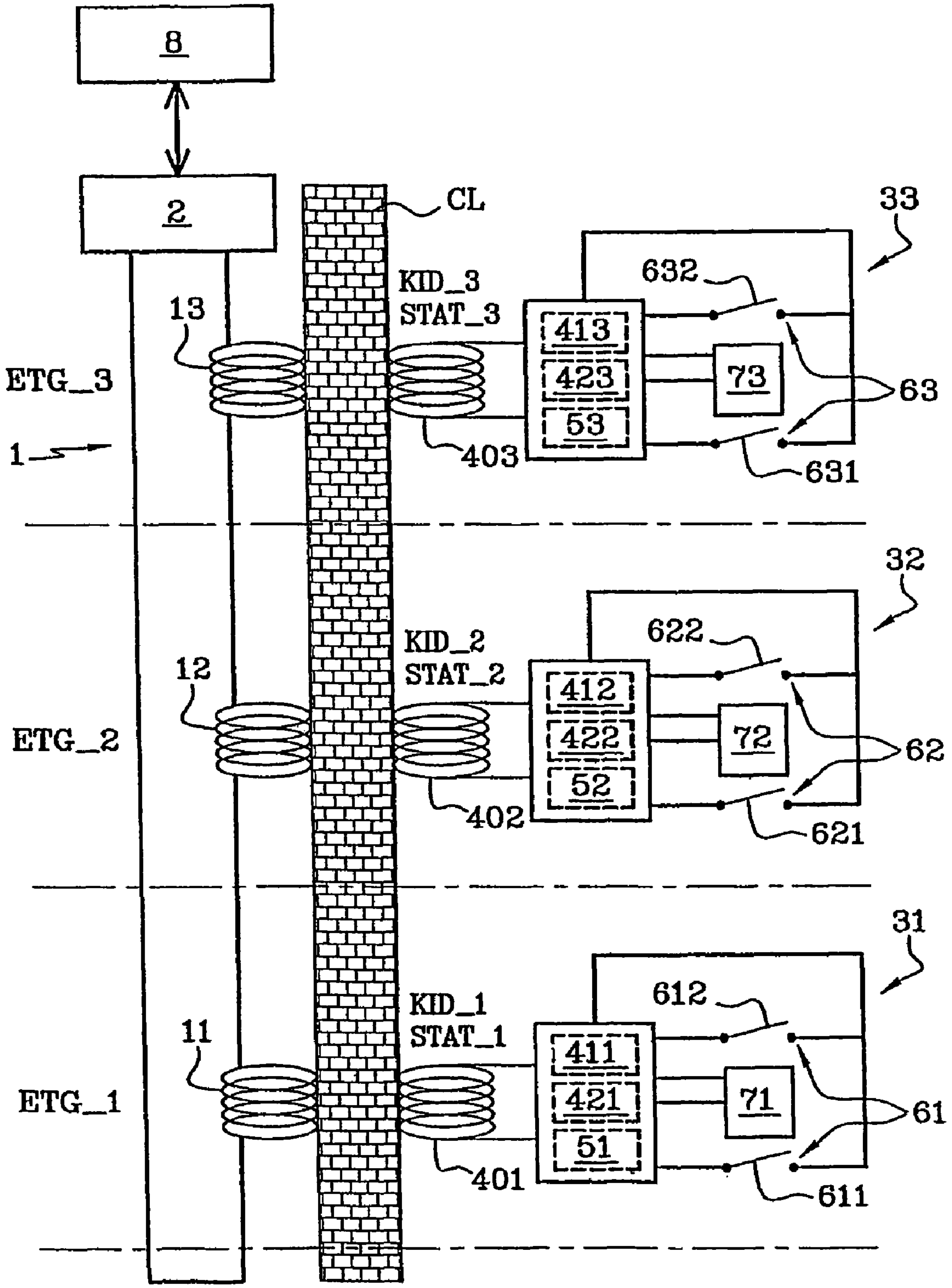
FIG. 3 is an overall diagrammatic view of a device according to the invention.

FIGS. 1 and 3 show an embodiment in which each status encoder comprises two appropriate elements formed by electrical contacts activated manually by a user, that is: contacts 611 and 612 for the status encoder 61; contacts 621 and 622 for the status encoder 62; and contacts 631, 632 for the status encoder 63.

Nonetheless, each status encoder can include, as well as or instead of such appropriate elements, one or several sensors sensitive to the influence of one or several physical parameters to which this peripheral device is subject.

Each peripheral device 31, 32 or 33, is provided with a processing unit 51, 52 or 53, internal or external to the electronic tag equipping this peripheral device, linked to the transmitter-receiver circuit 421, 422 or 423 of this peripheral device, and in charge of collecting, coding and/or formatting the instantaneous status STAT_1, STAT_2 or STAT_3 so that this status is taken into account by the transmitter-receiver circuit.

According to another aspect of the invention, essential in the case of a localized remote reading of statuses, the controller 2 is provided with a configuration memory 21 in which, for each peripheral device 31, 32 or 33, are stored the identification code KID_1, KID_2 or KID_3 of this peripheral device, and a localisation parameter such as LOC_1, LOC_2 or LOC_3, that identifies the location of this peripheral device in the network 1, the localisation parameter of each peripheral device being correlated, meaning associated, with the identification code of this same peripheral device.

As those skilled in the art will easily understand from reading the present description, the association, in the configuration memory 21 of the controller 2, of the localization parameter of each peripheral device with the identification code of this same peripheral device, can be produced by implementing known means, during an installation phase of the device according to the invention.

As a result of this arrangement, the controller 2 can thus, by reading at the same time both the instantaneous status STAT_1, STAT_2 or STAT_3 and the identification code KID_1, KID_2 or KID_3 of each peripheral device 31, 32 or 33 it scans, associate each of the read instantaneous statuses to a determined location of the network 1.

In these conditions, each of the peripheral devices 31 to 33 can form a call terminal in the network 1, the controller 2 itself ensuring the management of remote calls through the intermediary of these peripheral devices or call terminals 31 to 33.

Figure 5:
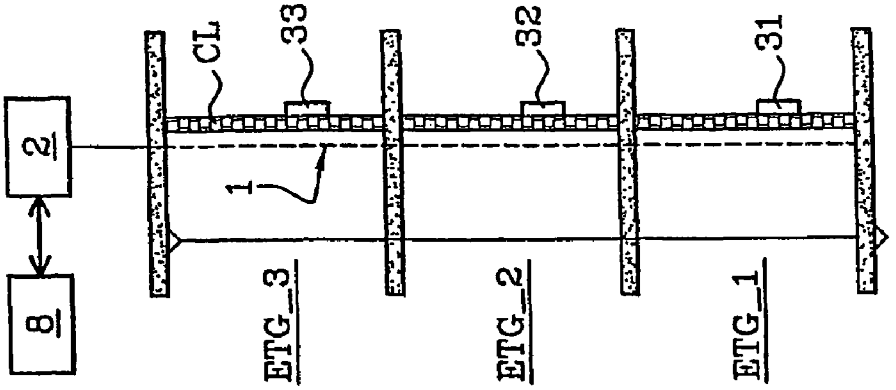
FIG. 5 is a cross-section of the same building, seen following the incidence defined by the arrows V-V of FIG. 4.
Figure 4:
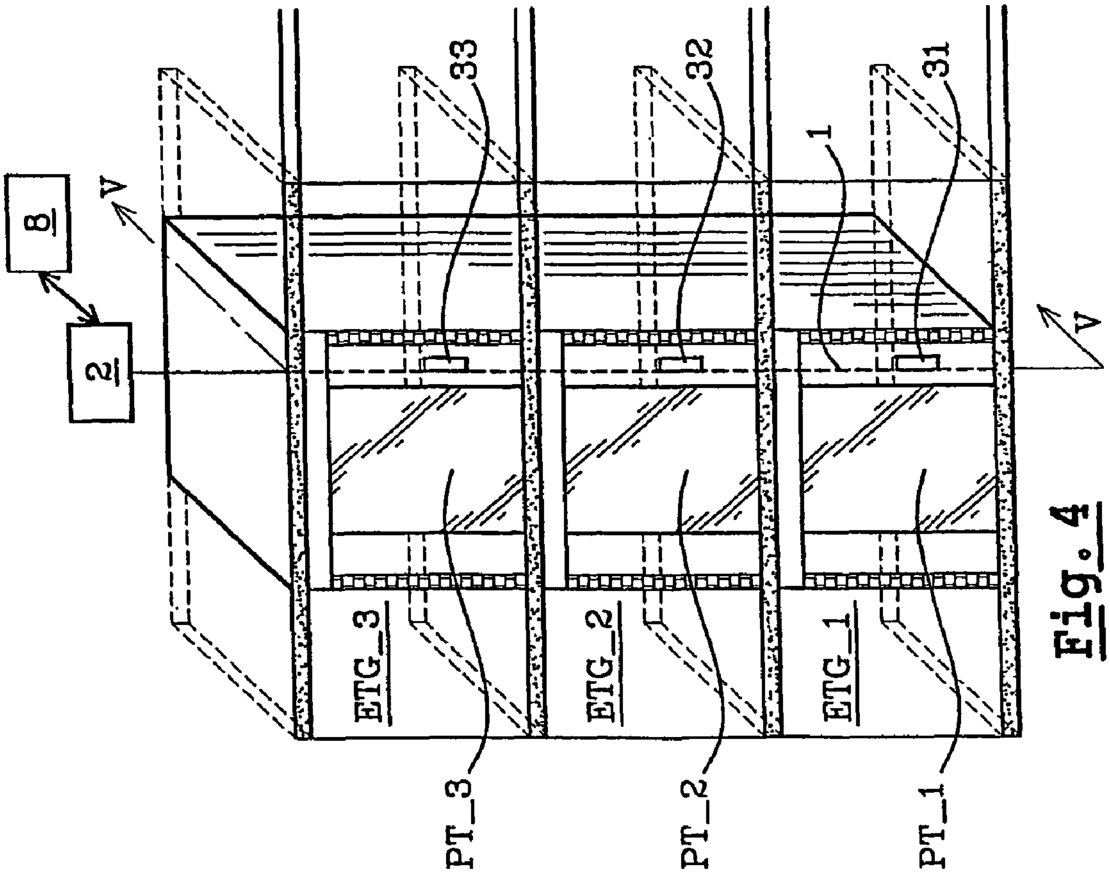
FIG. 4 is a diagrammatic view in transparent perspective of a building equipped with a an elevator managed by a device according to the invention.

FIGS. 3 to 5 show an application of the device according to the invention for management of an elevator.

In this application, the communication network 1 to which the controller 2 is linked includes induction loops such as 11, 12 and 13, set in regular fashion on one side of the vertical partition CL that closes the front face of the elevator column, for example on the right-hand side of each elevator door, PT_1, PT_2, and PT_3.

The peripheral devices 31, 32 and 33 are set on the other side of the partition CL, on the different corresponding floors ETG_1, ETG_2 and ETG_3.

Since the different peripheral devices 31, 32 and 33 communicate with the controller 2 on the network 1 thanks to the electromagnetic influence that the loops 11, 12 and 13 can exert through the partition CL, these peripheral devices can simply, for example, be attached onto the partition CL, close to the corresponding door PT_1, PT_2 or PT_3

In this case, the localization parameters, such as LOC_1, LOC_2 and LOC_3, stored in the configuration memory 21 of the controller 2 are representative of the different floors, the identification code KID_1 of the peripheral device 31 thus being associated with the localization parameter ETG_1, representing the first floor where this peripheral device is installed, the identification code KID_2 of the peripheral device 32 being associated with the localization parameter ETG_2, representing the second floor where this peripheral device is installed, etc.

Besides the configuration memory 21, the controller 2 includes a transmitter-receiver circuit 22 in charge of ensuring electrical energy transmission and information transmission on the network 1, a processing unit 23 ensuring information processing as a whole in this controller and having a reading and writing access to the configuration memory 21, and an interface 24 piloted by the processing unit 23 and ensuring the link between the processing unit 23 and a command circuit 8 of the elevator.

Each of the peripheral devices 31, 32 and 33 possesses an electric contact 611, 621 and 631, that the user can command with a button to indicate that he wishes to go down to a lower floor, and an electric contact 612, 622 and 632, that the user can command with a button to indicate that he wishes to go up to an upper floor.

If, for example, a user presses on the contact button 622 of the peripheral device 32 situated on the second floor, referenced ETG_2, the controller 2 will receive the identification code KID_2 from this peripheral device, and the status STAT_2 of the status encoder 62, this STAT_2 status representing the activation of the contact button 622.

By reading its memory 21, the controller 2 will thus be informed that a user, situated on floor ETG_2, that is the second floor, has called the elevator and has, more precisely, indicated his wish to go up to an upper floor.

This call can thus be transmitted, through the intermediary of the controller interface 24, to the command circuit 8 of the elevator, which will take over to send the most readily available elevator cabin to the second floor in order to reach an upper floor.

It is evident that each of the peripheral devices could have a single button only, whose activation would then be taken into account just like a call for the elevator for any a priori destination, the user not indicating his destination until inside the elevator cabin, by activating the button of the floor required.

On the other hand, each of the peripheral devices 31, 32 or 33, instead of having only one single call button for access to an upper floor, and a call button for access to a lower floor, could possess, as status encoder 61, 62 or 63, a keyboard on which the user could specifically indicate the floor of destination, meaning that the status STAT_1, STAT_2 or STAT_3 of each status encoder can a priori be represented by any number of bits whatsoever.

As shown in FIGS. 1 and 3, each peripheral device such as 31, 32 or 33 can furthermore include a display element such as 71, 72 or 73, this element being connected to the processing unit 51, 52 or 53, which in return retransmits the display instructions received from the controller 2 by the transmitter-receiver circuit 421, 422 or 423.

This display element 71, 72 or 73 thus makes it possible to make available, at the position of each of the peripheral devices, information pertinent for the whole of these peripheral devices, such as the instantaneous movement instruction to the elevator cabin, or the floor number this cabin has reached.

As those skilled in the art will have understood by reading the present description, the partition CL of the production mode shown fulfills the function of a support for the peripheral devices 31 to 33 and that of a dielectric separating the induction loops 11 to 13 of the antennae 401 to 403.

These same functions could thus be fulfilled, in other applications of the invention, by materials completely different from those able to constitute a partition of a building.

For example, wallpaper covering the walls of a room could both contain or cover a network of induction loops passing through these walls, and acting as support for a plurality of peripheral devices, for example taking the form of simple tags stuck onto its surface and making remote command possible, in selective manner, for lighting or electrical equipment respectively, distributed throughout the whole room.

In the same way, a fabric for clothing, such as a jacket, could be passed through by a network of induction loops and act as support for a command element for electric equipment, such as a magnetic tape or CD-ROM reader housed in the collar of this clothing, this command element being, for example, fixed onto the clothing by means of a simple Velcro hook and loop fastener.

The invention claimed is:

1. A system for remote status readings, comprising:

an elevator communication network comprising a plurality of stationary electromagnetic induction loops wired together;

a central controller linked to the communication network; and a plurality of peripheral devices linked to the central controller through the communication network, each of the plurality of peripheral devices associated with a respective one of the plurality of electromagnetic induction loops, each of the plurality of peripheral devices being stationary relative to the respective one of the plurality of electromagnetic induction loops, each peripheral device having an instantaneous status belonging to a plurality of possible statuses, the controller being operative to periodically scan the peripheral devices to read their respective instantaneous statuses, each peripheral device having a display element displaying information pertinent to all of the plurality of peripheral devices, the communication network linking the peripheral devices to the controller and communicating with the peripheral devices by inductive coupling through the electromagnetic induction loops, each of the peripheral devices being powered by inductive coupling with the associated one of the plurality of electromagnetic induction loops of the communication network wherein each of the peripheral devices receives power through a same one of the plurality of electromagnetic induction loops through which the peripheral device communicates.

2. The system for remote status readings according to claim 1, wherein the communication network comprises a series circuit supplied by the controller.

3. The system for remote status readings according to claim 2, wherein each peripheral device has its own identification code, the controller having a configuration memory in which are stored correlatively, for each peripheral device, the identification code of the peripheral device and a localization parameter identifying the location of the peripheral device in the network, the controller being operative to read, for each peripheral device, the instantaneous status and identification code of the peripheral device, with a result that each instantaneous status read is correlated, by the controller, to a location in the network.

4. The system for remote status readings according to claim 3, wherein each peripheral device includes a transmitter-receiver circuit and at least one status encoder adopting an instantaneous status constituting or participating in building up the instantaneous status of the peripheral device, the status encoder being linked to the transmitter-receiver circuit to allow the peripheral device to transmit the instantaneous status of the encoder to the controller.

5. The system for remote status readings according to claim 4, wherein each peripheral device includes an electronic tag having a memory containing the identification code attributed to the peripheral device, a local antenna coupled to one of the plurality of electromagnetic induction loops of the communication network to receive electrical energy transmitted by the one of the plurality of electromagnetic induction loops, and the transmitter-receiver circuit, the transmitter-receiver circuit being linked to the local antenna so as to be able at least to receive from the controller a transmission order and to be able to transmit to the controller, apart from the instantaneous status of the encoder, the identification code of the tag.

6. The system for remote status readings according to claim 4, wherein each peripheral device includes, as the status encoder, at least one appropriate element.

7. The system for remote status readings according to claim 6, wherein the appropriate element is an electric contact.

8. The system for remote status readings according to claim 4, wherein each peripheral device includes, as the status encoder, at least one sensor sensitive to influence of a physical parameter to which the peripheral device is subjected.

9. The system for remote status readings according to claim 1, wherein each peripheral device forms a command terminal for management of remote commands.

10. The system for remote status readings according to claim 4, wherein each peripheral device forms a call terminal for management of remote calls.

11. The system for remote status readings according to claim 10, wherein each peripheral device is installed at a specific location and forms a call terminal for a means of transport.

12. The system for remote status readings according to claim 11, wherein each peripheral device is installed on a respective floor of a building and forms a call terminal for an elevator.

13. The system for remote status readings according to claim 11, wherein the status encoder of each peripheral device includes a plurality of appropriate elements each of which identifies an assigned destination for the means of transport from a departure position represented by the specific location.

14. The system for remote status readings according to claim 2, wherein each peripheral device includes a local antenna coupled to one of the plurality of electromagnetic induction loops of the communication network to receive electrical energy transmitted by the one of the plurality of electromagnetic induction loops.

15. The system for remote status readings according to claim 14, wherein the one of the plurality of induction loops and antenna are separated by a support, the peripheral devices being supplied with electrical energy through the support.

16. The system for remote status readings according to claim 15, wherein the support is formed of a dielectric material.

17. The system for remote status readings according to claim 16, wherein the support is formed as a partition.

18. The system for remote status readings according to claim 2, wherein an electric power signal circulating in the series circuit has a frequency lower than 500 kHZ.

19. The system for remote status readings according to claim 18, wherein the electric power signal in the series circuit is modulated at 125 kHZ.

20. The system for remote status readings according to claim 2, wherein an electric power signal circulating in the series circuit has a frequency between 500 kHZ and 125 kHZ.

21. An elevator installation at a building, the elevator installation comprising:

a first power induction loop positioned at a wall of a first floor space of the building;

a second power induction loop positioned at a wall of a second floor space of the building, the first and second power induction loops being wired to each other;

a first peripheral device induction loop positioned at the wall of the first floor space and inductively coupled through the wall of the first floor space with the first power induction loop, the first peripheral device induction loop and the first power induction loop being stationary relative to each other;

a second peripheral device induction loop positioned at the wall of the second floor space and inductively coupled through the wall of the second floor space with the second power induction loop, the second peripheral device induction loop and the second power induction loop being stationary relative to each other;

a first peripheral circuit component wired to the first peripheral device induction loop, the first peripheral circuit component comprising a first switch indicating a first elevator operation call through the first peripheral device induction loop and through the first power induction loop wherein the first peripheral circuit component communicates through the first power induction loop and receives power from the first power induction loop; and a second peripheral circuit component wired to the second peripheral induction loop, the second peripheral circuit component comprising a second switch indicating a second elevator operation call through the second peripheral device induction loop and through the second power induction loop wherein the second peripheral circuit communicates through the second power induction loop and receives power from the second power induction loop, wherein the first peripheral circuit component and the second peripheral circuit component each have a display element displaying information pertinent to all the peripheral circuit components.

22. A method for remote status readings, comprising:

powering a plurality of peripheral devices from a central controller via an elevator communication network, each of the plurality of peripheral devices having a device induction loop, the communication network comprising a plurality of stationary electromagnetic induction loops wired together, each of the plurality of electromagnetic induction loops being associated with the device induction loop of a respective one of the plurality of peripheral devices and being stationary relative to the respective one of the plurality of peripheral devices, each of the plurality of peripheral devices being powered via inductive coupling between the device induction loop and the associated one of the plurality of electromagnetic induction loops, each of the plurality of peripheral devices having a display element displaying information pertinent to all of the plurality of peripheral devices;

linking each of the plurality of peripheral devices for communication with the central controller through the communication network via inductive coupling between the device induction loop and the associated one of the plurality of electromagnetic induction loops wherein each of the peripheral devices receives power through a same one of the plurality of electromagnetic induction loops through which the peripheral device communicates; and scanning each of the plurality of peripheral devices via the communication network to read an instantaneous status of each of the plurality of peripheral devices via the communication network, the instantaneous status belonging to a plurality of possible statuses.

* * * * *